United States Patent
Xu et al.

(10) Patent No.: US 12,175,075 B2
(45) Date of Patent: Dec. 24, 2024

(54) METHOD FOR IMPROVING MESSAGE STORAGE EFFICIENCY OF NETWORK CHIP, DEVICE, AND STORAGE MEDIUM

(71) Applicant: SUZHOU CENTEC COMMUNICATIONS CO., LTD., Jiangsu (CN)

(72) Inventors: Zixuan Xu, Jiangsu (CN); Jie Xia, Jiangsu (CN); Zhiheng Chang, Jiangsu (CN)

(73) Assignee: SUZHOU CENTEC COMMUNICATIONS CO., LTD., Jiangsu (CN)

( * ) Notice: Subject to any disclaimer, the term of this patent is extended or adjusted under 35 U.S.C. 154(b) by 0 days.

(21) Appl. No.: 17/773,065

(22) PCT Filed: Aug. 20, 2020

(86) PCT No.: PCT/CN2020/110163
§ 371 (c)(1),
(2) Date: Apr. 29, 2022

(87) PCT Pub. No.: WO2021/088466
PCT Pub. Date: May 14, 2021

(65) Prior Publication Data
US 2024/0143169 A1    May 2, 2024

(30) Foreign Application Priority Data

Nov. 4, 2019 (CN) .......................... 201911064428.1

(51) Int. Cl.
*G06F 12/00* (2006.01)
*G06F 3/06* (2006.01)

(52) U.S. Cl.
CPC .......... *G06F 3/0608* (2013.01); *G06F 3/0629* (2013.01); *G06F 3/0673* (2013.01)

(58) Field of Classification Search
CPC ..... G06F 3/0608; G06F 3/0629; G06F 3/0673
(Continued)

(56) References Cited

U.S. PATENT DOCUMENTS

| 10,402,315 B1 | 9/2019 | Fenol et al. |
| 2009/0034548 A1 | 2/2009 | Soni et al. |
| 2010/0299460 A1 | 11/2010 | Wang |

FOREIGN PATENT DOCUMENTS

| CN | 1855881 A | 11/2006 |
| CN | 102455974 A | 5/2012 |

(Continued)

OTHER PUBLICATIONS

International Search Report for corresponding application PCT/CN2020/110163 filed Aug. 20, 2020; Mail date Nov. 27, 2020.
(Continued)

*Primary Examiner* — Mardochee Chery
(74) *Attorney, Agent, or Firm* — Samson G. Yu (57) ABSTRACT

A method for improving message storage efficiency of a network chip, a device, and a storage medium are provided. The method comprises: configuring a data memory, dividing the data memory into N small RAMs, and managing respective RAMs by means of a link list; in a case where a write data request is received on any input interface, parsing and acquiring a channel number corresponding to the input interface, accessing a channel write state memory according to the channel number to acquire channel write state information, in a case of determining, according to the channel write state information, that at least one RAM is null, writing data into the data memory; and in a case where a read-out scheduling request is received on any channel, recombining data according to memory information in a link list memory and reading the recombined data out.

20 Claims, 2 Drawing Sheets

(58) Field of Classification Search
USPC .......................................................... 711/154
See application file for complete search history.

(56) References Cited

FOREIGN PATENT DOCUMENTS

| | | | | | |
|---|---|---|---|---|---|
| CN | 105743814 | A | * | 7/2016 | ............. G06F 12/02 |
| CN | 106126435 | A | | 11/2016 | |
| CN | 106603434 | A | | 4/2017 | |
| CN | 105610814 | B | * | 9/2018 | ............. H04L 49/90 |
| CN | 109857342 | A | | 6/2019 | |
| CN | 110806986 | A | | 2/2020 | |
| EP | 2751668 | B1 | * | 8/2018 | ......... G06F 9/30036 |
| SE | 1150966 | A1 | * | 4/2013 | |

OTHER PUBLICATIONS

CN Search Report for corresponding application 201911064428.1 filed Nov. 4, 2019.
Wu, Dongming er al. "Design and Implementation of Queue Manager for Access Gateway in IP Satellite Network". Communications Technology. Oct. 31, 2017 (Oct. 31, 2017). vol. 50, No. 10. pp. 2366-2371.

* cited by examiner

Fig. 1

METHOD FOR IMPROVING MESSAGE STORAGE EFFICIENCY OF NETWORK CHIP, DEVICE, AND STORAGE MEDIUM

CROSS REFERENCE

The present application is a National Stage Filing of PCT Application No. PCT/CN2020/110163 filed on Aug. 20, 2020, which claims priority to Chinese Patent Application No. 201911064428.1, filed on Nov. 4, 2019 and entitled "Method for Improving Message Storage Efficiency of Network Chip, Device, and Storage medium", the disclosure of which is hereby incorporated by reference in its entirety.

TECHNICAL FIELD

The present disclosure belongs to the technical field of communication, and mainly relates to a method for improving message storage efficiency of a network chip, a device, and a storage medium.

BACKGROUND

Figure 1:
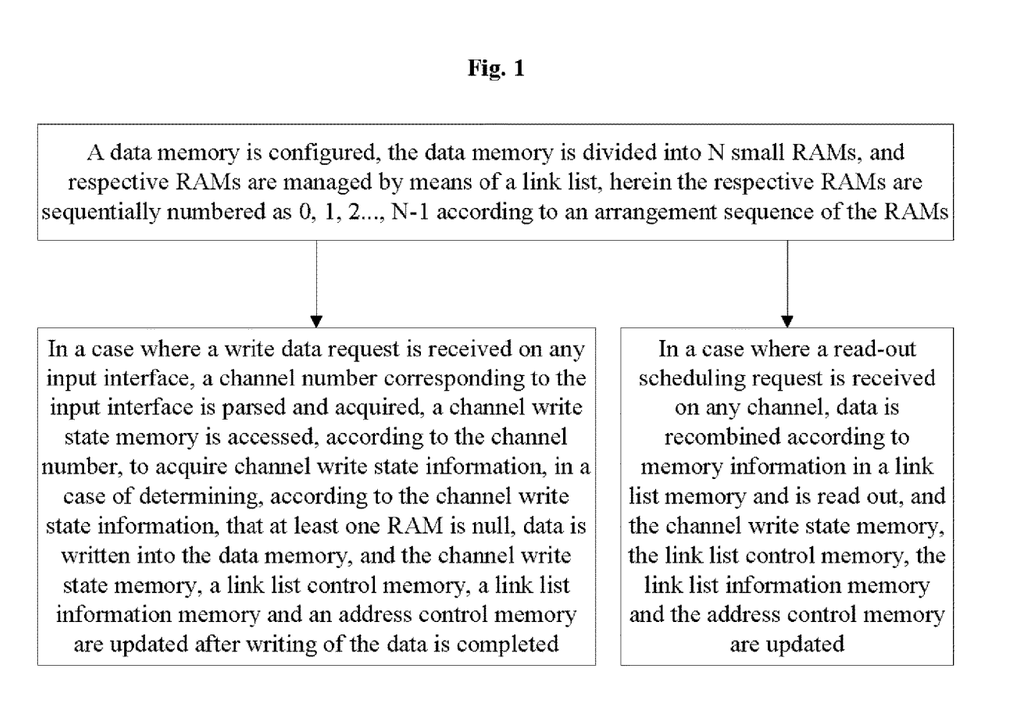
FIG. 1 illustrates a flowchart of a method for improving message storage efficiency of a network chip provided by an implementation of the present disclosure.

In a high-density network chip, data from a plurality of channels converges to a data collection module and is scheduled to the interior of the chip for processing. Generally, the input of the data collection module has X data channels each having a bit width of W. The data collection module caches the data in a memory and sends the data to a processing module inside the chip by using an interface with a bit width of N*W. As shown in FIG. 1, an MAC receives a message, and sends the message to the data collection module through an interface with a width of W. It can be seen that a message with a length of L will be divided into N_in sets of data, herein N_in=int(L/W), and into) is the rounding up operation. After being cached by the data collection module, the data is gathered into N_out sets of data with the bit width of N*W and is sent to the processing module inside the chip, herein N_out=int(L/(N*W)). When the last set of data of the message is sent, an "end mark" signal will be generated to the data collection module, so as to indicate that the current data is the last set of data of the message.

In actual network deployment, there may be a phenomenon that the output bandwidth of the data collection module is less than the input bandwidth within a short time, and this phenomenon is called exceeding of bandwidth on the network chip. When the exceeding of bandwidth on the network chip occurs, the entrance traffic of the memory inside the data reception module is greater than the export traffic of the memory, which causes a full state of the memory, thus resulting in new data being discarded because of lack of storage space. Therefore, the memory depth P and the storage efficiency of the memory directly affect the capacity of the data collection module in dealing with burst traffic.

The memory is implemented by using N Random Access Memories (RAMs) with the depth of P and the width of W. When data is written, a write address $Y(0<=Y<=P-1)$ is acquired first, and the data is written into $RAM_0$ to $RAM_{N-1}$ in sequence according to the offset of the current data relative to the length of the message. For example, the first set of data of the message is written into the address Y of the $RAM_0$, the second set of data of the message is written into the address Y of $RAM_1$, and so on. When the data has been written into this address on N RAMs or an end mark of the data is received, a scheduling request will be initiated, and the data of N RAMs is read out simultaneously according to a certain scheduling strategy and is sent to the processing module inside the chip. Subsequently, an address will be acquired for new data and the data is written in the RAMs starting from $RAM_0$.

However, when the received data is short or the length of the message is not evenly divisible by (N*W), for example, an "end mark" is received upon the completion of writing the data into the $RAM_0$, in such a case, other data cannot be written into a physical space corresponding to the address in $RAM_1$ to $RAM_{N-1}$, since a read end reads out the data of N RAMs at the same time, and disorder will be caused if other data is written. It can be seen that the use efficiency of the memory is relatively low in such cases. Particularly, when the length of the message is W, the storage efficiency of the data memory is only 1/N.

SUMMARY

In order to solve the abovementioned technical problems, implementations of the present disclosure provide a method for improving message storage efficiency of a network chip, a device, and a storage medium.

Some implementations of the present disclosure provide a method for improving message storage efficiency of a network chip. The method comprises that: a data memory is configured, the data memory is divided into N small RAMs, and respective RAMs are managed by means of a link list. Herein the respective RAMs are sequentially numbered as 0, 1, 2, ..., N−1 according to an arrangement sequence of the RAMs.

In a case where a write data request is received on any input interface, a channel number corresponding to the input interface is parsed and acquired, a channel write state memory is accessed according to the channel number to acquire channel write state information, in a case of determining, according to the channel write state information, that at least one RAM is null, data is written into the data memory, and the channel write state memory, a link list control memory, a link list information memory and an address control memory are updated after writing of the data is completed.

In a case where a read-out scheduling request is received on any channel, data is recombined according to memory information in a link list memory and the recombined data is read out, and the channel write state memory, the link list control memory, the link list information memory and the address control memory are updated.

The channel write state memory stores the channel write state information. The channel write state information comprises: a data offset counter, a RAM address offset counter, a RAM address, and a link list address. The link list control memory comprises: a head pointer memory, a tail pointer memory, the link list memory, and a link list state memory. The link list information memory is configured to store link list information, and the link list information comprises: the RAM address used and a value of the RAM address offset counter when any data is written into the data memory. The data offset counter is used for indicating an offset of currently written data. The RAM address offset counter is used for indicating a number of the RAM for storing the currently written data. The RAM address is used for indicating an address of the RAM for storing the currently written data. The link list address is used for recording an address of a link list.

As a further improvement of an implementation of the present disclosure, the method further comprises that: during data writing, in a case where the link list state memory corresponding to the channel is null, a writing operation is performed in each of the head pointer memory and the tail pointer memory by taking the channel number as an address and taking a link list address of the data as a value, and simultaneously, the link list state memory is changed to be not null.

In a case where the link list state memory corresponding to the channel is not null, a writing operation is performed in the link list memory by taking the link list address of the data as a value and taking a tail pointer as an address, so as to complete a linking operation. Simultaneously, a writing operation is performed in the tail pointer memory by taking the channel number as an address and taking the link list address of the data as a value, so as to complete an updating operation of the tail pointer.

During data reading out, the head pointer memory and the tail pointer memory are accessed according to the channel number, so as to determine whether a head pointer is equal to the tail pointer. In a case where the head pointer is equal to the tail pointer, the link list state memory corresponding to the channel is set to be null. In a case where the head pointer is not equal to the tail pointer, the link list memory is accessed according to the head pointer to obtain a next hop pointer, and a writing operation is performed in the head pointer memory by taking the next hop pointer as a value and taking the channel number as an address.

As a further improvement of an implementation of the present disclosure, in the case where the write data request is received on any input interface, the method comprises the following operations.

In a case where the acquired value of the RAM address offset counter is 0, whether a new write address is able to be acquired is determined. In a case where the new write address is able to be acquired, the RAM address is updated by using the new write address, and the data is written into the new write address, wherein the new write address is one of specific addresses in the RAM numbered as 0, and simultaneously, 1 is added to the value of the RAM address offset counter. In a case where the new write address is not able to be acquired, the current data is discarded.

In a case where the acquired value of the RAM address offset counter is not 0, then the RAM address and the RAM address offset counter stored in the channel write state memory are acquired, and current data is written into an address pointed by the RAM address and the RAM address offset counter. Simultaneously, in a case where the value of the RAM address offset counter does not point to the last RAM, then 1 is added to the value of the RAM address offset counter. In a case where the value of the RAM address offset counter points to the last RAM, then the value of the RAM address offset counter is set to be 0.

As a further improvement of an implementation of the present disclosure, in the case where the write data request is received on any input interface, the method comprises the following operations.

In a case where an acquired value of the data offset counter is 0, then the link list address is updated according to the RAM address and the value of the RAM address offset counter, wherein the link list address=RAM address*N+the value of the RAM address offset counter. Simultaneously, in a case where the written data carries an end mark, the data offset counter is set to be 0; and in a case where the written data does not carry the end mark, 1 is added to the value of the data offset counter.

In a case where the acquired value of the data offset counter is not 0, and the write data carries the end mark and/or the value of the data offset counter points to the last RAM, the data offset counter is set to be 0; and in a case where the written data does not carry the end mark and the value of the data offset counter points to the last RAM, 1 is added to the value of the data offset counter.

As a further improvement of an implementation of the present disclosure, while setting the data offset counter to be 0, the method further comprises the following operations.

The corresponding channel write state memory is updated based on the updated link list address and the channel number.

The corresponding RAM address and the corresponding value of the RAM address offset counter when the current data is written into the data memory are updated to the link list information memory.

A read-out scheduling request is generated.

As a further improvement of an implementation of the present disclosure, in the case where the read-out scheduling request is received on any channel, the method comprises the following operations.

In the case where the read-out scheduling request is received on a specific channel, the link list control memory is accessed and queried to acquire a head pointer, and the link list information memory is read, by taking the head pointer as a keyword, to acquire the link list information. The link list information comprises: a head address, a head offset, a tail address, and a tail offset.

The head address represents a read address of a first set of currently read-out data; the head address=int(head pointer/N); the head offset represents the number of the RAM into which the first set of the currently read-out data is written, and the head offset=head pointer % N; the tail address represents a read address of a last set of the currently read-out data, and a value of the tail address is a RAM address in the corresponding link list information; the tail offset represents the number of the RAM into which the last set of the currently read-out data is written, and the value of the tail offset is the value of the RAM address offset counter in the corresponding link list information.

In a case where the head address is equal to the tail address, all data between the head offset and the tail offset is read out by using the head address.

In a case where the head address is not equal to the tail address, all data between the head offset and last RAM is read out by using the head address, and all data between the first RAM and the tail offset is read out by using the tail address.

The read-out data is recombined according to a write sequence and the recombined read-out data is output.

As a further improvement of an implementation of the present disclosure, the method further comprises: in a case where the recombined read-out data is less than N*W, zeros are added at low bits of the recombined read-out data and then the data is output.

As a further improvement of an implementation of the present disclosure, in the case where the read-out scheduling request is received on any channel, and after the data is read out, the method further comprises the following operations.

In a case where the head address is equal to the tail address and the tail offset points to the last RAM, or in a case where the head address is not equal to the tail address, the head address is released to perform address recycling.

In a case where the tail offset does not point to the last RAM, the channel write state memory is read according to the channel number of a read operation. If the currently read tail address is equal to the RAM address in the channel write state memory, and the value of the RAM address offset counter in the channel write state memory=tail offset+1, then the tail address is released to perform address recycling. Simultaneously, the RAM address offset counter in the channel write state memory is set to be 0.

An implementation of the present disclosure provides an electronic device, comprising a memory and a processor. The memory stores a computer program that can be run on the processor. When the processor executes the program, the operations in the method of improving the message storage efficiency of the network chip as described above are implemented.

An implementation of the present disclosure provides a computer-readable storage medium, having a computer program stored thereon. When the computer program is executed by the processor, the operations in the method of improving the message storage efficiency of the network chip as described above are implemented.

Compared with the related art, the implementations of the present disclosure have the following beneficial effects. According to the method for improving the message storage efficiency of the network chip, the device, and the storage medium, the data memory is divided into N small RAMs through a new read-write control logic, and respective RAMs are managed precisely by means of a link list, so that the physical space of the data memory is fully used, and the storage efficiency of the data memory is greatly improved.

DETAILED DESCRIPTION OF THE IMPLEMENTATIONS

The present disclosure will be described in detail below with reference to exemplary implementations shown in the drawings. However, these implementations do not limit the present disclosure. All structural, methodological, or functional changes made by those of ordinary skill in the art are comprised within the scope of protection of the present disclosure.

Figure 2:
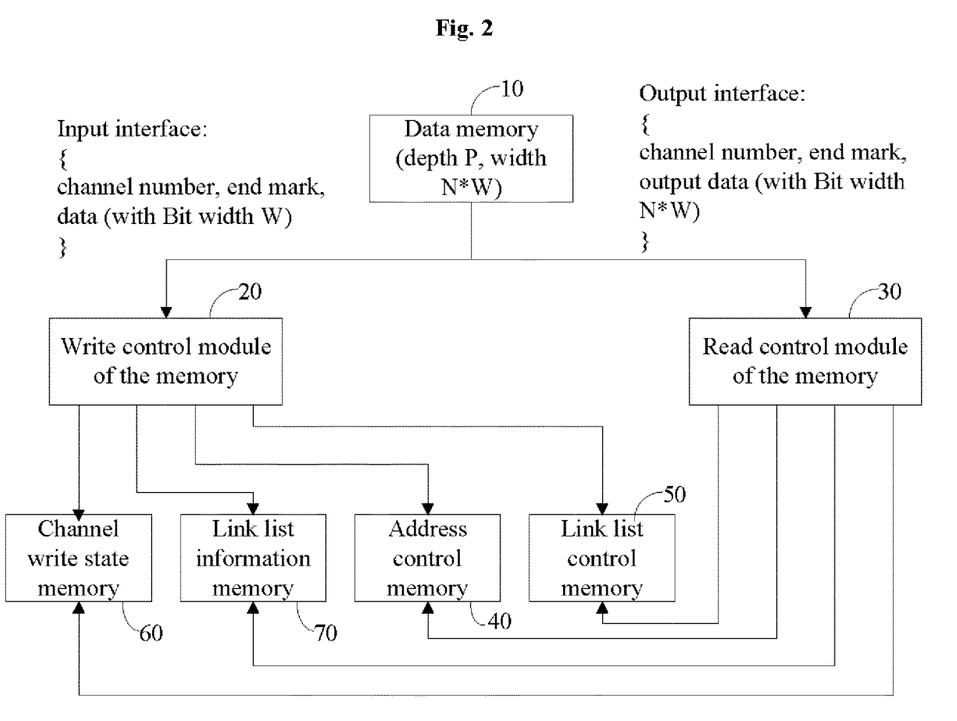
FIG. 2 illustrates a schematic diagram of a read-write control principle of the network chip of a specific example of the present disclosure.

As shown in FIG. 1 and FIG. 2, a method for improving message storage efficiency of a network chip provided by an implementation of the present disclosure comprises the following operations.

A data memory is configured, the data memory is divided into N small RAMs, and respective RAMs are managed by means of a link list. Herein the respective RAMs are sequentially numbered as 0, 1, 2 ... , N−1 according to an arrangement sequence of the RAMs.

In a case where a write data request is received on any input interface, a channel number corresponding to the input interface is parsed and acquired, a channel write state memory is accessed according to the channel number to acquire channel write state information, in a case of determining, according to the channel write state information, that at least one RAM is null, data is written into the data memory, and the channel write state memory, a link list control memory, a link list information memory and an address control memory are updated after writing of the data is completed.

In a case where a read-out scheduling request is received on any channel, data is recombined according to memory information in a link list memory and the recombined data is read out, and the channel write state memory, the link list control memory, the link list information memory and the address control memory are updated.

As shown in FIG. 2, the data memory 10 is configured to cache message data sent from an input interface, and is composed of N physical RAMs with the depth of P and the width of W. A write control module 20 of the data memory decides how to write and store data. A read control module 30 of the data memory decides how to read the data and how to maintain an address. An address control memory 40 is configured to store a write address of the data memory 10. A link list control memory 50 is configured to control conventional link list enqueuing and dequeuing operations, and comprises a head pointer memory, a tail pointer memory, a link list memory, a link list state memory, etc. Of course, in other implementations of the present disclosure, the link list control memory 50 further comprises other memories. Since only the memories listed above are involved in the present disclosure, other memories are not further described.

A channel write state memory 60 comprises: a data offset counter, a RAM address offset counter, a RAM address, and a link list address. A link list information memory 70 is configured to store link list information. The link list information comprises: the RAM address used and a value of the RAM address offset counter when any data is written into the data memory 10. The data offset counter is used for indicating the offset of the currently written data, For example, certain data comprises three sets of data, which occupy the storage spaces with the numbers of 0, 1, and 2 in sequence. For the written data, the value of the data offset counter corresponding a first set of data points to the RAM numbered as 0, the value of the data offset counter corresponding a second set of data points to the RAM numbered as 1, and the value of the data offset counter corresponding a third set of data points to the RAM numbered as 2. Specifically, when the data is written into the RAMs, if the current data offset counter does not point to the last RAM, i.e., the value of current data offset counter is not equal to N−1, and then 1 is added to the data offset counter, and otherwise, the data offset counter is set to be 0. The RAM address offset counter is used for indicating a number of the RAM for storing the currently written data, i.e., for indicating which of $RAM_0$ to $RAM_{N-1}$ is the data written into. When the data is written into the RAM, if the current RAM address offset counter does not point to the last RAM, that is, the value of the RAM address offset counter is not equal to N−1, then 1 is added to the RAM address offset counter, and otherwise, the RAM address offset counter is set to be 0. The RAM address is used for indicating an address of the RAM for storing the currently written data. The range of the RAM address is 0 to P−1. The link list address is used for recording the address of a link list.

It is to be noted that all write state memories need to be configured to be 0 when a chip is initialized.

In an exemplary implementation process of the present disclosure, the method comprises that: during data writing, in a case where the link list state memory corresponding to the channel is null, a writing operation is performed in each of the head pointer memory and the tail pointer memory by taking the channel number as an address and taking a link list address of the data as a value, and simultaneously, the link list state memory is changed to be not null.

In a case where the link list state memory corresponding to the channel is not null, a writing operation is performed in the link list memory by taking the link list address of the data as a value and taking a tail pointer as an address, so as to complete a linking operation. Simultaneously, a writing operation is performed in the tail pointer memory by taking the channel number as an address and taking the link list address of the data as a value, so as to complete an updating operation of the tail pointer.

During data reading out, the head pointer memory and the tail pointer memory are accessed according to the channel number, and whether a head pointer is equal to the tail pointer is determined. In a case where the head pointer is equal to the tail pointer, the link list state memory corresponding to the channel is set to be null. In a case where the head pointer is not equal to the tail pointer, the link list memory is accessed according to the head pointer to obtain a next hop pointer, and a writing operation is performed in the head pointer memory by taking the next hop pointer as a value and taking the channel number as an address.

In an exemplary implementation of the present disclosure, in a case where a write data request is received on any input interface, data updating is performed according to the value of the RAM address offset counter. Correspondingly, the method comprises the following operations: in a case where the acquired value of the RAM address offset counter is 0, whether a new write address is able to be acquired is determined. In a case where the new write address is able to be acquired, the RAM address is updated by using the new write address, and the data is written into the new write address, wherein the new write address is one of specific addresses in the RAM numbered as 0, and meanwhile, 1 is added to the value of the RAM address offset counter. In a case where the new write address is not able to be acquired, the current data is discarded.

In a case where the acquired value of the RAM address offset counter is not 0, then the RAM address and the RAM address offset counter stored in the channel write state memory 60 are acquired, and current data is written into an address pointed by the RAM address and the RAM address offset counter. Simultaneously, in a case where the value of the RAM address offset counter does not point to the last RAM, then 1 is added to the value of the RAM address offset counter. In a case where the value of the RAM address offset counter points to the last RAM, then the value of the RAM address offset counter is set to be 0.

In the implementation, when it is determined that the value of the RAM address offset counter is 0, and the new write address is not able to be acquired, it represents that the address of the data memory 10 is exhausted, and in such case, the current data needs to be discarded.

Further, in a case where a write data request is received on any input interface, data updating is performed according to the value of the data offset counter. Correspondingly, the method comprises: in a case where an acquired value of the data offset counter is 0, then the link list address is updated according to the RAM address and the value of the RAM address offset counter, wherein the link list address=RAM address*N+the value of the RAM address offset counter. Simultaneously, in a case where the written data carries an end mark, the data offset counter is set to be 0; and in a case where the written data does not carry the end mark, 1 is added to the value of the data offset counter.

In a case where the acquired value of the data offset counter is not 0, when the write data carries the end mark and/or the value of the data offset counter points to the last RAM, the data offset counter is set to be 0; and when the write data does not carry the end mark and the value of the data offset counter does not point to the last RAM, 1 is added to the value of the data offset counter.

Further, when the data offset counter is set to be 0, it represents that either the end mark is received, or a set of N*W data has been fully collected. In such case, the method further comprises that: the corresponding channel write state memory 60 is updated by using the updated link list address and the channel number, link list information is updated, that is, the link list information memory 70 is updated by using the corresponding RAM address and the corresponding value of the RAM address offset counter when the current data is written into the data memory 10; and a read-out scheduling request is generated. In the case where the read-out scheduling request is received on any channel, that is, after receiving the scheduling request, the memory read control module 30 will schedule the data in a channel from which the request is sent according to a certain strategy. Specifically, the method comprises the following operations.

In the case where the read-out scheduling request is received on a specific channel, the link list control memory 50 is accessed and queried to acquire a head pointer, and the link list information memory 70 is read, by taking the head pointer as a keyword, to acquire the link list information. The link list information comprises: a head address, a head offset, a tail address, and a tail offset.

The head address represents a read address of a first set of currently read-out data. The head address=int(head pointer/N), int indicates rounding, the head offset represents the number of the RAM into which the first set of the currently read-out data is written, that is, the head offset indicates which RAM is the first set of data written into, the head offset=head pointer % N, and % indicates taking a remainder. The tail address represents a read address of a last set of the currently read-out data. The value of the tail address is a RAM address in the corresponding link list information. The tail offset represents the number of the RAM into which the last set of the currently read-out data is written, that is, which RAM is the last set of data written into, and the value of the tail offset is the value of the RAM address offset counter in the corresponding link list information.

In a case where the head address is equal to the tail address, all data between the head offset and last RAM is read out by using the head address. For example, "the head offset" is 1, the "tail offset" is 3, then $RAM_1$, $RAM_2$, and $RAM_3$ are read. In a case where the head address is not equal to the tail address, then all data between the head offset and the last RAM is read out by using the head address, and all data between the first RAM and the tail offset is read out by using the tail address.

The read-out data is recombined according to a write sequence and the recombined data is output.

It is to be noted that, in order to ensure the correctness of the data, the data needs to be output after being rearranged according to a write sequence strictly. Specifically, in a case where the head address is equal to the tail address, then the recombined data=(RAM head offset, . . . , RAM tail offset), and the read address is the head address. In a case where the head address is not equal to the tail address, then the recombined data={$RAM_{head\ offset}$, . . . , $RAM_{N-1}$, $RAM_0$, . . . , $RAM_{tail\ offset}$}. Herein the read address of the $RAM_{head\ offset}$, . . . , $RAM_{N-1}$ is the head address, and the read address of the $RAM_0$, . . . , $RAM_{tail\ offset}$ is the tail address.

As an exemplary implementation, the method further comprises: in a case where the recombined read-out data is less than N*W, zeros are added at low bits of the recombined read-out data and then the data is output.

In the case where the read-out scheduling request is received on any channel, and after the data is read out, the address of the data memory 10 needs to be recycled. Correspondingly, the method further comprises the following operations.

In a case where the head address is equal to the tail address and the tail offset points to the last RAM, or in a case where the head address is not equal to the tail address, then it represents that the $RAM_0$ to the $RAM_{N-1}$ corresponding to the head address are all read, in such case, the head address is released to perform address recycling.

In a case where the tail offset does not point to the last RAM, the channel write state memory 60 is read according to the channel number of a read operation. If the currently read tail address is equal to the RAM address in the channel write state memory 60, and the value of the RAM address offset counter in the channel write state memory 60=tail offset+1, it represents that the currently read data is the last data of the channel. In such case, the tail address may be released to perform address recycling, and simultaneously, the RAM address offset counter in the channel write state memory 60 is set to be 0.

According to the implementations in the present disclosure, a method of dynamically recycling an address is used, which can avoid a problem that after some channels occupy a certain write address, the address is occupied for a long time and cannot be recycled since there is no data written in.

An implementation of the present disclosure provides an electronic device, comprising a memory and a processor. The memory stores a computer program that can be run on the processor. When the processor executes the program, the operations in the method of improving the message storage efficiency of the network chip as described above are implemented.

An implementation of the present disclosure provides a computer readable storage medium, having a computer program stored thereon. When the computer program is executed by the processor, the operations in the method of improving the message storage efficiency of the network chip as described above are implemented.

By the abovementioned method, the use efficiency of the data memory can be greatly improved. For example, when the message length received by a chip is equal to W, only P messages can be cached by the conventional storage method, and the use efficiency of the memory is 1/N. However, N*P messages can be cached by the read-write method provided in the above implementations of the present disclosure, and the use efficiency of the data memory is 100%. Further, in the above implementations of the present disclosure, as long as the message length received by the chip is an integral multiple of W, the use efficiency of the data memory can reach 100%.

In addition, it is to be noted that the bit width of the output data listed in the above implementations of the present disclosure is N times the bit width of the input data. Correspondingly, the memory is composed of N RAMs. Such setting is to facilitate the description of the present disclosure. A person of ordinary skill in the art can easily deduce that there is no inevitable equal relationship between a multiple of the bit width of output/input data and the number of data memory partitions according to the method provided in the implementations of the present disclosure. For example, the output bit width may be equal to the input bit width. The data memory may still be divided into N (N is an integer greater than 1) small RAMs. In such case, the data memory still has very high storage efficiency when the length of the message is relatively small.

In conclusion, according to the method for improving message storage efficiency of the network chip, the device, and the storage medium, the data memory is divided into N small RAMs through a new read-write control logic, and respective RAMs are managed precisely by means of a link list, so that the physical space of the data memory is fully used, and the memory efficiency of the data memory is greatly improved.

The system implementations described above are only illustrative. The modules described as separate parts may or may not be physically separated, and parts shown as modules are physical modules, may be located in one module in a chip logic, or may be distributed on a plurality of data processing modules in the chip. Part or all of the modules may be selected according to actual needs to achieve the technical effect of the solution of the present implementation. Those of ordinary skill in the art can understand and implement the present disclosure without creative work.

The present application can be used in numerous general-purpose or special-purpose communication chips, such as switching chips, router chips, and server chips.

It should be understood that although the description is described according to the implementations, it does not mean that every implementation only contains an independent technical solution. This way of description is only for the sake of clarity. Those of ordinary skill in the art should take the description as a whole, and the technical solutions in various implementations can also be properly combined to form other implementations that can be understood by those of ordinary skill in the art.

A series of detailed descriptions listed above are only specific descriptions for feasible implementations of the present disclosure, and they are not used to limit the scope of protection of the present disclosure. Any equivalent implementations or changes made without departing from the technical principle of the present disclosure shall be comprised in the scope of protection of the present disclosure.

The invention claimed is:

1. A method for improving memory storage efficiency of a network chip, comprising:
    configuring a data memory, the data memory is composed of N Random Access Memories (RAMs), and managing respective RAMs by means of a link list, wherein the respective RAMs are sequentially numbered as 0, 1, 2 . . . , N−1 according to an arrangement sequence of the RAMs, wherein N is an integer greater than 1;
    in a case where a write data request is received on any input interface, parsing and acquiring a channel number corresponding to the input interface, accessing a channel write state memory according to the channel number to acquire channel write state information, in a case of determining, according to the channel write state information, that data stored in at least one RAM is null, writing data into the data memory, and updating the channel write state memory, a link list control memory, a link list information memory and an address control memory after writing of the data is completed;
    in a case where a read-out scheduling request is received on any channel, recombining data according to memory information in a link list memory and reading the recombined data out, and updating the channel write state memory, the link list control memory, the link list information memory and the address control memory, wherein
    the channel write state memory stores the channel write state information; the channel write state information comprises: a data offset counter, a RAM address offset counter, a RAM address, and a link list address; the link list control memory comprises: a head pointer memory, a tail pointer memory, the link list memory, and a link list state memory; the link list information memory is configured to store link list information, and the link list information comprises: the RAM address used and a value of the RAM address offset counter when any data is written into the data memory; the data offset counter is used for indicating an offset of currently written data; the RAM address offset counter is used for indicating a number of the RAM for storing the currently written data; the RAM address is used for indicating an address of the RAM for storing the currently written data; and the link list address is used for recording an address of a link list.

2. The method for improving memory storage efficiency of a network chip according to claim 1, further comprising: during data writing, in a case where the link list state memory corresponding to the channel is null, performing a writing operation in each of the head pointer memory and the tail pointer memory by taking the channel number as an address and taking a link list address of the data as a value, and changing the link list state memory to be not null;

in a case where the link list state memory corresponding to the channel is not null, performing a writing operation in the link list memory by taking the link list address of the data as a value and taking a tail pointer as an address, so as to complete a linking operation; performing a writing operation in the tail pointer memory by taking the channel number as an address and taking the link list address of the data as a value, so as to complete an updating operation of the tail pointer;

during data reading out, accessing the head pointer memory and the tail pointer memory according to the channel number, so as to determine whether a head pointer is equal to the tail pointer; in a case where the head pointer is equal to the tail pointer, setting the link list state memory corresponding to the channel to be null; and in a case where the head pointer is not equal to the tail pointer, accessing the link list memory according to the head pointer to obtain a next hop pointer, and performing a writing operation in the head pointer memory by taking the next hop pointer as a value and taking the channel number as an address.

3. The method for improving memory storage efficiency of a network chip according to claim 1, wherein in the case where the write data request is received on any input interface, the method comprises:

in a case where an acquired value of the RAM address offset counter is 0, determining whether a new write address is able to be acquired; in a case where the new write address is able to be acquired, updating the RAM address by using the new write address, and writing the data into the new write address, wherein the new write address is one of specific addresses in the RAM numbered as 0, and adding 1 to the value of the RAM address offset counter; in a case where the new write address is not able to be acquired, discarding the current data;

in a case where the acquired value of the RAM address offset counter is not 0, then acquiring the RAM address and the RAM address offset counter stored in the channel write state memory, and writing the current data into an address pointed by the RAM address and the RAM address offset counter; and in a case where the value of the RAM address offset counter does not point to the last RAM, then adding 1 to the value of the RAM address offset counter; and in a case where the value of the RAM address offset counter points to the last RAM, then setting the value of the RAM address offset counter to be 0.

4. The method for improving memory storage efficiency of a network chip according to claim 1, wherein in the case where the write data request is received on any input interface, the method comprises:

in a case where an acquired value of the data offset counter is 0, then updating the link list address according to the RAM address and the value of the RAM address offset counter, wherein the link list address=RAM address*N+the value of the RAM address offset counter; in a case where the written data carries an end mark, setting the data offset counter to be 0; in a case where the written data does not carry the end mark, adding 1 to the value of the data offset counter;

in a case where the acquired value of the data offset counter is not 0, and the written data carries the end mark and/or the value of the data offset counter points to the last RAM, setting the data offset counter to be 0; and in a case where the written data does not carry the end mark and the value of the data offset counter points to the last RAM, adding 1 to the data offset counter.

5. The method for improving memory storage efficiency of a network chip according to claim 4, wherein while setting the data offset counter to be 0, the method further comprises:

updating the corresponding channel write state memory based on the updated link list address and the channel number;

updating, into the link list information memory, the corresponding RAM address and the corresponding value of the RAM address offset counter when the current data is written into the data memory; and generating a read-out scheduling request.

6. The method for improving memory storage efficiency of a network chip according to claim 1, wherein in the case where the read-out scheduling request is received on any channel, the method comprises:

in the case where the read-out scheduling request is received on a specific channel, accessing and querying the link list control memory to acquire a head pointer, and reading the link list information memory, by taking the head pointer as a keyword, to acquire the link list information, wherein the link list information comprises: a head address, a head offset, a tail address, and a tail offset, wherein the head address represents a read address of a first set of currently read-out data; the head address=int (head pointer/N); the head offset represents the number of the RAM into which the first set of the currently read-out data is written, and the head offset=head pointer % N; the tail address represents a read address of a last set of the currently read-out data, and a value of the tail address is a RAM address in the corresponding link list information; the tail offset represents the number of the RAM into which the last set of the currently read-out data is written, and the value of the tail offset is the value of the RAM address offset counter in the corresponding link list information;

in a case where the head address is equal to the tail address, then reading out all data between the head offset and the tail offset by using the head address;

in a case where the head address is not equal to the tail address, then reading out all data between the head offset and the last RAM by using the head address, and reading out all data between the first RAM and the tail offset by using the tail address; and recombining the read-out data according to a writing sequence and outputting the recombined read-out data.

7. The method for improving memory storage efficiency of a network chip according to claim 6, further comprising: in a case where the recombined read-out data is less than N*W, adding zeros at low bits of the recombined read-out data and then outputting the data.

8. The method for improving memory storage efficiency of a network chip according to claim 6, wherein in the case where the read-out scheduling request is received on any channel and after the data is read out, the method further comprises:

in a case where the head address is equal to the tail address and the tail address points to the last RAM, or in a case where the head address is not equal to the tail address, releasing the head address to perform address recycling;

in a case where the tail offset does not point to the last RAM, reading the channel write state memory according to the channel number of a read operation; if the currently read tail address is equal to the RAM address in the channel write state memory, and the value of the RAM address offset counter in the channel write state memory=tail offset+1, then releasing the tail address to perform address recycling; and setting the RAM address offset counter in the channel write state memory to be 0.

9. An electronic device, comprising a memory and a processor, wherein the memory stores a computer program capable of running on the processor, wherein operations in the method for improving the message storage efficiency of the network chip according to claim 1 are implemented when the processor executes the program.

10. A non-transitory computer readable storage medium, having a computer program stored thereon, wherein operations in the method for improving the message storage efficiency of the network chip according to claim 1 are implemented when the computer program is executed by a processor.

11. A network chip, comprising: a data memory, a read control module of the data memory and a write control module of the data memory which are implemented by a processor, a channel write state memory, a link list control memory, a link list information memory and an address control memory, wherein the data memory is composed of N Random Access Memories (RAMs), and respective RAMs are managed by means of a link list, wherein the respective RAMs are sequentially numbered as 0, 1, 2 . . . , N−1 according to an arrangement sequence of the RAMs, wherein N is an integer greater than 1;

in a case where a write data request is received on any input interface, the write control module of the data memory is configured to parse and acquire a channel number corresponding to the input interface, access the channel write state memory according to the channel number to acquire channel write state information, in a case of determining, according to the channel write state information, that data stored in at least one RAM is null, write data into the data memory, and update the channel write state memory, the link list control memory, the link list information memory and the address control memory after writing of the data is completed;

in a case where a read-out scheduling request is received on any channel, the read control module of the data memory is configured to recombine data according to memory information in a link list memory and read the recombined data out, and update the channel write state memory, the link list control memory, the link list information memory and the address control memory, wherein the channel write state memory stores the channel write state information; the channel write state information comprises: a data offset counter, a RAM address offset counter, a RAM address, and a link list address; the link list control memory comprises: a head pointer memory, a tail pointer memory, the link list memory, and a link list state memory; the link list information memory is configured to store link list information, and the link list information comprises: the RAM address used and a value of the RAM address offset counter when any data is written into the data memory; the data offset counter is used for indicating an offset of currently written data; the RAM address offset counter is used for indicating a number of the RAM for storing the currently written data; the RAM address is used for indicating an address of the RAM for storing the currently written data; and the link list address is used for recording an address of a link list.

12. The network chip according to claim 11, wherein during data writing, in a case where the link list state memory corresponding to the channel is null, the write control module of the data memory is configured to perform a writing operation in each of the head pointer memory and the tail pointer memory by taking the channel number as an address and taking a link list address of the data as a value, and change the link list state memory to be not null;

in a case where the link list state memory corresponding to the channel is not null, the write control module of the data memory is configured to perform a writing operation in the link list memory by taking the link list address of the data as a value and taking a tail pointer as an address, so as to complete a linking operation; perform a writing operation in the tail pointer memory by taking the channel number as an address and taking the link list address of the data as a value, so as to complete an updating operation of the tail pointer;

during data reading out, the read control module of the data memory is configured to access the head pointer memory and the tail pointer memory according to the channel number, so as to determine whether a head pointer is equal to the tail pointer; in a case where the head pointer is equal to the tail pointer, set the link list state memory corresponding to the channel to be null; and in a case where the head pointer is not equal to the tail pointer, access the link list memory according to the head pointer to obtain a next hop pointer, and perform a writing operation in the head pointer memory by taking the next hop pointer as a value and taking the channel number as an address.

13. The network chip according to claim 11, wherein in the case where the write data request is received on any input interface, the write control module of the data memory is configured to:

in a case where an acquired value of the RAM address offset counter is 0, determine whether a new write address is able to be acquired; in a case where the new write address is able to be acquired, update the RAM address by using the new write address, and write the data into the new write address, wherein the new write address is one of specific addresses in the RAM numbered as 0; and add 1 to the value of the RAM address offset counter; in a case where the new write address is not able to be acquired, discard the current data;

in a case where the acquired value of the RAM address offset counter is not 0, then acquire the RAM address and the RAM address offset counter stored in the channel write state memory, and write the current data into an address pointed by the RAM address and the RAM address offset counter; and in a case where the value of the RAM address offset counter does not point to the last RAM, then add 1 to the value of the RAM address offset counter; and in a case where the value of the RAM address offset counter points to the last RAM, then set the value of the RAM address offset counter to be 0.

14. The network chip according to claim 11, wherein in the case where the write data request is received on any input interface, the write control module of the data memory is configured to:

in a case where an acquired value of the data offset counter is 0, then update the link list address according to the RAM address and the value of the RAM address offset counter, wherein the link list address=RAM address*N+the value of the RAM address offset counter; in a case where the written data carries an end mark, set the data offset counter to be 0; in a case where the written data does not carry the end mark, add 1 to the value of the data offset counter;

in a case where the acquired value of the data offset counter is not 0, and the written data carries the end mark and/or the value of the data offset counter points to the last RAM, set the data offset counter to be 0; and in a case where the written data does not carry the end mark and the value of the data offset counter points to the last RAM, add 1 to the data offset counter.

15. The network chip according to claim 14, wherein while setting the data offset counter to be 0, the write control module of the data memory is further configured to:

update the corresponding channel write state memory based on the updated link list address and the channel number;

update, into the link list information memory, the corresponding RAM address and the corresponding value of the RAM address offset counter when the current data is written into the data memory; and generate a read-out scheduling request.

16. The network chip according to claim 11, wherein in the case where the read-out scheduling request is received on any channel, the read control module of the data memory is configured to:

in the case where the read-out scheduling request is received on a specific channel, access and querying the link list control memory to acquire a head pointer, and read the link list information memory, by taking the head pointer as a keyword, to acquire the link list information, wherein the link list information comprises: a head address, a head offset, a tail address, and a tail offset, wherein the head address represents a read address of a first set of currently read-out data; the head address=int (head pointer/N); the head offset represents the number of the RAM into which the first set of the currently read-out data is written, and the head offset=head pointer % N; the tail address represents a read address of a last set of the currently read-out data, and a value of the tail address is a RAM address in the corresponding link list information; the tail offset represents the number of the RAM into which the last set of the currently read-out data is written, and the value of the tail offset is the value of the RAM address offset counter in the corresponding link list information;

in a case where the head address is equal to the tail address, then read out all data between the head offset and the tail offset by using the head address;

in a case where the head address is not equal to the tail address, then read out all data between the head offset and the last RAM by using the head address, and read out all data between the first RAM and the tail offset by using the tail address; and recombine the read-out data according to a writing sequence and outputting the recombined read-out data.

17. The network chip according to claim 16, wherein in a case where the recombined read-out data is less than N*W, the read control module of the data memory is further configured to add zeros at low bits of the recombined read-out data and then outputting the data.

18. The network chip according to claim 16, wherein in the case where the read-out scheduling request is received on any channel and after the data is read out, the read control module of the data memory is further configured to:

in a case where the head address is equal to the tail address and the tail address points to the last RAM, or in a case where the head address is not equal to the tail address, release the head address to perform address recycling;

in a case where the tail offset does not point to the last RAM, read the channel write state memory according to the channel number of a read operation; if the currently read tail address is equal to the RAM address in the channel write state memory, and the value of the RAM address offset counter in the channel write state memory=tail offset+1, then release the tail address to perform address recycling; and set the RAM address offset counter in the channel write state memory to be 0.

19. A non-transitory computer readable storage medium, having a computer program stored thereon, wherein operations in the method for improving the message storage efficiency of the network chip according to claim 2 are implemented when the computer program is executed by a processor.

20. A non-transitory computer readable storage medium, having a computer program stored thereon, wherein operations in the method for improving the message storage efficiency of the network chip according to claim 3 are implemented when the computer program is executed by a processor.

* * * * *